(12) United States Patent
Ji et al.

(10) Patent No.: US 10,479,276 B2
(45) Date of Patent: *Nov. 19, 2019

(54) CLOAKING DEVICES CONSTRUCTED FROM REFLECTION BOUNDARIES, HALF-MIRRORS AND MULTIBAND DICHROIC COLOR FILTERS AND VEHICLES COMPRISING THE SAME

(71) Applicant: Toyota Motor Engineering & Manufacturing North America, Inc., Plano, TX (US)

(72) Inventors: Chengang Ji, Ann Arbor, MI (US); Kyu-Tae Lee, Ann Arbor, MI (US); Songtao Wu, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,398

(22) Filed: Apr. 4, 2018

(65) Prior Publication Data

US 2019/0310450 A1 Oct. 10, 2019

(51) Int. Cl.
*B60R 1/00* (2006.01)
*B60R 1/08* (2006.01)
(Continued)

(52) U.S. Cl.
CPC .............. *B60R 1/007* (2013.01); *B60R 1/081* (2013.01); *B60R 1/082* (2013.01); *B60R 1/10* (2013.01);
(Continued)

(58) Field of Classification Search
CPC ......... B60R 1/007; B60R 1/082; G02B 27/14; G02B 27/283; G02B 5/3083; G02B 17/06;
(Continued)

(56) References Cited

U.S. PATENT DOCUMENTS

| 5,307,162 A * | 4/1994 | Schowengerdt | .......... | H04N 7/18 348/122 |
| 5,392,161 A * | 2/1995 | Weder | .................... | A63H 33/22 359/861 |

(Continued)

FOREIGN PATENT DOCUMENTS

CN 105093506 A 11/2015

*Primary Examiner* — Bao-Luan Q Le
(74) *Attorney, Agent, or Firm* — Dinsmore & Shohl LLP

(57) ABSTRACT

A cloaking device includes an object-side, an image-side, a cloaked region (CR) between the object-side and the image-side. An object-side CR reflection boundary, an object-side half-mirror, and an object-side multiband dichroic color filter are positioned on the object side and an image-side CR reflection boundary, an image-side half-mirror, and an image-side multiband dichroic color filter are positioned on the image-side. The object-side half-mirror and the object-side multiband dichroic color filter are spaced apart from and positioned generally parallel to the object-side CR reflection boundary, and the image-side half-mirror and the image-side multiband dichroic color filter are spaced apart from and positioned generally parallel to the image-side CR reflection boundary. Light from an object located on the object-side of the cloaking device and obscured by the CR propagates via three optical paths to form an image of the object on the image-side of the cloaking device.

20 Claims, 6 Drawing Sheets

(51) Int. Cl.
*G02B 27/14* (2006.01)
*G02B 17/06* (2006.01)
*G02B 17/02* (2006.01)
*G02B 17/00* (2006.01)
*G02B 27/10* (2006.01)
*B60R 1/10* (2006.01)

(52) U.S. Cl.
CPC ......... *G02B 17/008* (2013.01); *G02B 17/026* (2013.01); *G02B 17/06* (2013.01); *G02B 27/1086* (2013.01); *G02B 27/14* (2013.01); *G02B 27/144* (2013.01); *G02B 27/145* (2013.01); *G02B 27/146* (2013.01)

(58) Field of Classification Search
CPC .... G02B 27/1086; G02B 27/144; G02B 5/30; G02B 5/3025
See application file for complete search history.

(56) References Cited

U.S. PATENT DOCUMENTS

| | | | |
|---|---|---|---|
| 5,930,048 A | 7/1999 | Kaneko | |
| 8,462,436 B2* | 6/2013 | Tilford | G02B 27/145 359/577 |
| 8,714,745 B2 | 5/2014 | Inoko | |
| 9,405,118 B1* | 8/2016 | Lu | G02B 27/00 |
| 9,557,547 B2* | 1/2017 | Choi | G02B 17/008 |
| 9,588,325 B2* | 3/2017 | Robertson | G03B 21/56 |
| 9,739,990 B2* | 8/2017 | Wu | G02B 17/023 |
| 9,971,161 B2* | 5/2018 | Chen | H01Q 15/08 |
| 2002/0162942 A1 | 11/2002 | Alden | |
| 2015/0183375 A1* | 7/2015 | Wu | G02B 17/023 359/734 |
| 2015/0248013 A1* | 9/2015 | Chen | H01Q 15/08 359/625 |
| 2016/0025956 A1* | 1/2016 | Choi | G02B 17/008 359/730 |
| 2017/0227781 A1 | 8/2017 | Banerjee et al. | |

* cited by examiner

CLOAKING DEVICES CONSTRUCTED FROM REFLECTION BOUNDARIES, HALF-MIRRORS AND MULTIBAND DICHROIC COLOR FILTERS AND VEHICLES COMPRISING THE SAME

TECHNICAL FIELD

The present specification generally relates to apparatuses and methods for making an object appear transparent and, more specifically, to cloaking devices for pillars of vehicles and vehicles comprising the same.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region (CR) between the object-side and the image-side, and a reference optical axis extending from the object-side to the image-side. An object-side CR reflection boundary, an object-side half-mirror, and an object-side multiband dichroic color filter are positioned on the object-side and an image-side CR reflection boundary, an image-side half-mirror, and an image-side multiband dichroic color filter are positioned on the image-side. The object-side half-mirror and the object-side multiband dichroic color filter are spaced apart from and positioned generally parallel to the object-side CR reflection boundary, and the image-side half-mirror and the image-side multiband dichroic color filter are spaced apart from and positioned generally parallel to the image-side CR reflection boundary. Light from an object located on the object-side of the cloaking device and obscured by the CR propagates via three optical paths to form an image of the object on the image-side of the cloaking device such that the light from the object appears to pass through the CR. Propagation of light from the object on the object-side of the cloaking device to the image-side to form the image includes a first optical path with reflection of the light from the object-side half-mirror and the image-side half-mirror, a second optical path with transmittance of the light through the object-side half-mirror and the image-side half-mirror, and a third optical path with transmittance of the light through the object-side multiband dichroic color filter and the image-side multiband dichroic color filter.

In some embodiments, the object-side multiband dichroic color filter is co-planar with the object-side half-mirror and the image-side multiband dichroic color filter is co-planar with the image-side half-mirror. In such embodiments, the object-side half-mirror may be positioned proximal to the reference optical axis relative to the object-side multiband dichroic color filter and the image-side half-mirror may be positioned proximal to the reference optical axis relative to the image-side multiband dichroic color filter.

According to another embodiment, a cloaking device assembly includes an object-side, an image-side, a cloaked region (CR) between the object-side and the image-side, and a reference optical axis extending from the object-side to the image-side. A first object-side CR reflection boundary, a first object-side half-mirror, and a first object-side multiband dichroic color filter are positioned on a first side of the reference optical axis, and a second object-side CR reflection boundary, a second object-side half-mirror, and a second object-side multiband dichroic color filter are positioned on a second side of the reference optical axis opposite the first side. The first and second object-side half-mirrors and the first and second object-side multiband dichroic color filters are spaced apart from and positioned generally parallel to the first and second CR reflection boundaries, respectively. A first image-side CR reflection boundary, a first image-side half-mirror, and a first image-side multiband dichroic color filter are positioned on the first side of the reference optical axis, and a second image-side CR reflection boundary, a second image-side half-mirror, and a second image-side multiband dichroic color filter are positioned on the second side of the reference optical axis opposite the first side. The first and second image-side half-mirrors and the first and second image-side multiband dichroic color filters are spaced apart from and positioned generally parallel to the first and second CR reflection boundaries, respectively. Light from an object located on the object-side of the cloaking device assembly propagates to the image-side and forms an image via three optical paths on the first side of the reference optical axis and three optical paths on the second side of the reference optical axis such that the light from the object appears to pass through the CR.

In embodiments, the first and second object-side multiband dichroic color filters are co-planar with the first and second object-side half-mirrors, respectively, and the first and second image-side multiband dichroic color filters are co-planar with the first and second image-side half-mirrors, respectively. In such embodiments, the first and second object-side half-mirrors may be positioned proximal to the reference optical axis relative to the first and second object-side multiband dichroic color filters, respectively, and the first and second first image-side half-mirrors may be positioned proximal to the reference optical axis relative to the first and second image-side multiband dichroic color filters, respectively.

Light from the object on the object-side of the cloaking device assembly propagates to the image-side to form the image via a pair of first optical paths, a pair of second optical paths, and a pair of third optical paths. The pair of first optical paths include a portion of light from the object being reflected from the first and second object-side half-mirrors and the first and second image-side half-mirrors. The pair of second optical paths include a portion of light from the object being transmitted through the first and second object-side half-mirrors and the first and second image-side half-mirrors. The pair of third optical paths include a portion of light from the object being transmitted through the first and second object-side multiband dichroic color filters and the first and second image-side multiband dichroic color filters.

According to another embodiment, a vehicle includes an A-pillar and a cloaking device positioned on the A-pillar. The cloaking device includes an object-side, an image-side, and a cloaked region (CR) between the object-side and the image-side. The object-side is positioned on an exterior of the vehicle and the image-side is positioned within an interior of the vehicle. An object-side CR reflection boundary, an object-side half-mirror, and an object-side multiband dichroic color filter are included and the object-side half-mirror and the object-side multiband dichroic color filter are spaced apart from and positioned generally parallel to the object-side CR reflection boundary. An image-side CR reflection boundary, an image-side half-mirror, and an image-side multiband dichroic color filter are also included, and the image-side half-mirror and the image-side multiband dichroic color filter are spaced apart from and positioned generally parallel to the image-side CR reflection boundary. In embodiments, the object-side multiband dichroic color filter is co-planar with the object-side half-mirror and the image-side multiband dichroic color filter is co-planar with the image-side half-mirror. In such embodiments, the object-side half-mirror may be positioned proximal to the reference optical axis relative to the object-side multiband dichroic color filter and the image-side half-mirror may be positioned proximal to the reference optical axis relative to the image-side multiband dichroic color filter. Light from an object located on the object-side of the cloaking device and obscured by the A-pillar propagates to the image side and forms an image via three optical paths such that the light from the object appears to pass through the A-pillar. Particularly, propagation of light from the object on the object-side of the cloaking device to the image-side to form the image includes a first optical path with reflection of a portion of the light from the object being reflected from the object-side half-mirror and the image-side half-mirror, a second optical path with transmittance of a portion of the light from the object through the object-side half-mirror and the image-side half-mirror, and a third optical path with transmittance of a portion of the light from the object through the object-side multiband dichroic color filter and the image-side multiband dichroic color filter.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of reflection boundaries, half-mirrors and multiband dichroic color filters that reflect and transmit light around a cloaked region. The cloaking devices described herein may be used, for example and without limitation, to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. In the alternative, or in addition to, cloaking devices described herein may be used to cloak home, office and industrial articles such as extension cords, electrical conduit, piping, etc. The utilization of the reflection boundaries, half-mirrors and multiband dichroic color filters allows an individual to perceive an image which, if not for the cloaking device, would be obstructed by an article. Various embodiments of cloaking devices and vehicles comprising the same will be described in further detail herein with specific reference to the appended drawings.

Figure 1A:
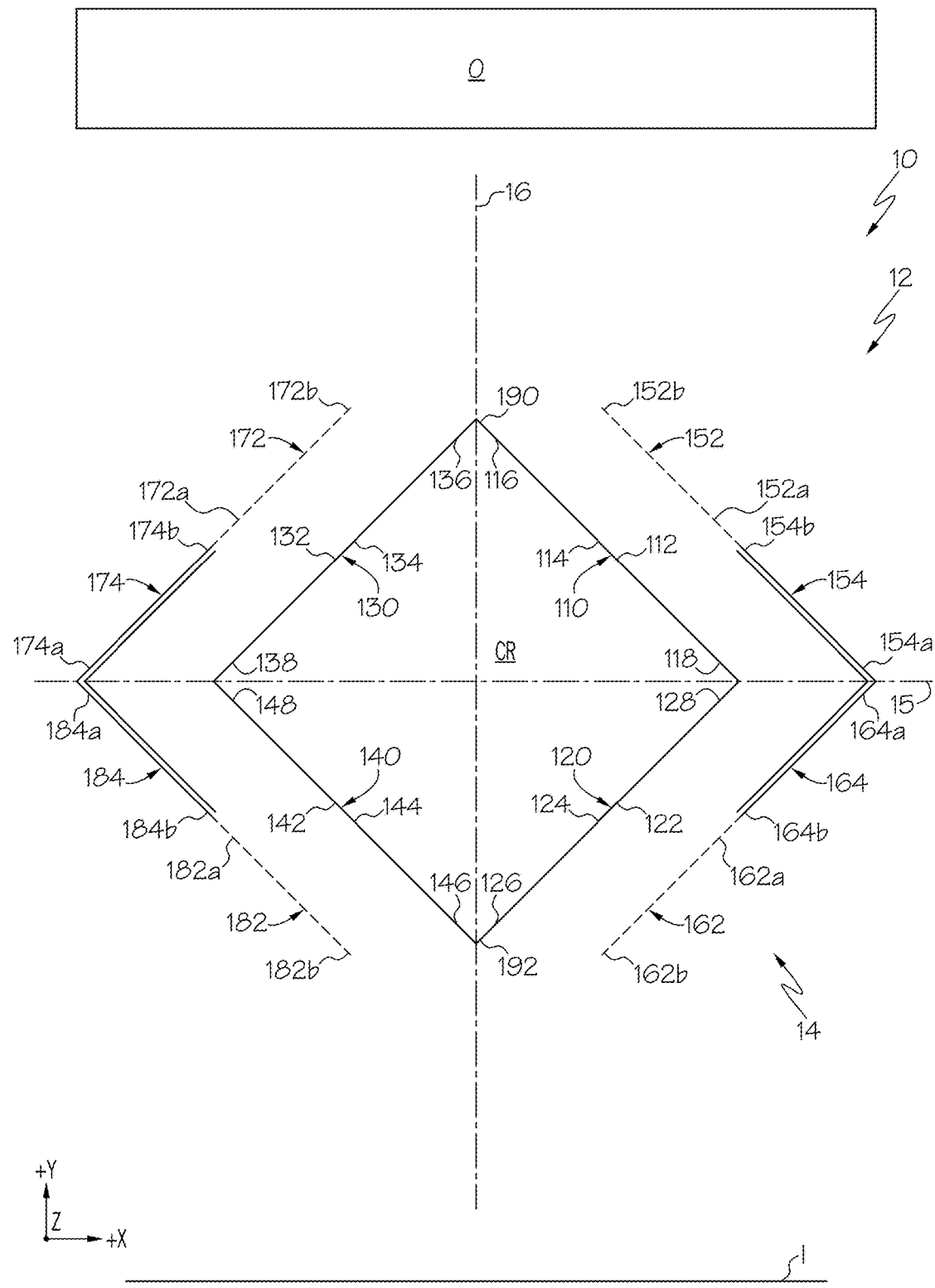
FIG. 1A schematically depicts a top view of a cloaking assembly according to one or more embodiments described and illustrated herein.

FIG. 1A generally depicts one embodiment of a cloaking device. The cloaking device includes an object-side, an image-side, and a cloaked region (CR) between the image-side and the object-side. A CR reflection boundary, a half-mirror, and a multiband dichroic color filter are positioned on the object-side of the cloaking device, and another CR reflection boundary, half-mirror and multiband dichroic color filter are positioned on the image-side of the cloaking device. As used herein, the terms "boundaries" and "boundary" refer to a physical surface. The term "half-mirror" as used herein refers to an optical filter that allows light waves of a specific polarization (e.g., p-polarized light or s-polarized light) to pass through the optical filter and reflects light waves of other polarizations (e.g., s-polarized light or p-polarized light). The term "multiband dichroic color filter" as used herein refers to a layer that reflects at least two separate ranges of wavelengths of visible light (e.g., wavelengths corresponding to different colors) and transmits at least two separate ranges of wavelengths of visible light.

Light from an object located on the object-side of the cloaking device and obscured by the cloaked region is redirected around the cloaked region via three optical paths to form an image of the object on the image-side of the cloaking device such that the light from the object appears to pass through the cloaked region. As used herein, the phrase "three optical paths" refers to a first optical path, a second optical path that is different than the first optical path due to different reflections by and/or transmittances through a plurality of optical components, and a third optical that is different than the first optical path and the second optical path due to different reflections by and/or transmittances through a plurality of optical components. For example, the first optical path may include light from the object on the object-side of the cloaking device being reflected by the CR reflection boundaries, half-mirrors and multiband dichroic color filters. The second optical path may include light from the object being transmitted through the half-mirrors, reflected by the CR reflection boundaries and the multiband dichroic color filters, and the third optical path may include light from the object being transmitted through the multiband dichroic color filters. Accordingly, the three optical paths redirect or "bend" light such that an individual will see the object located on the opposite side of the cloaked region (and thus on the opposite side of a cloaked article) giving the visual impression that the cloaked article is transparent.

Still referring to FIG. 1A, embodiments of a cloaking device include a cloaking assembly 10 with an object-side 12, an image-side 14, four CR reflection boundaries 110, 120, 130, 140, and a cloaked region CR at least partially bounded by the CR reflection boundaries 110, 120, 130, 140. In embodiments, the CR reflection boundaries 110, 120, 130, 140 are planar reflection boundaries. In other embodiments (not depicted), the CR reflection boundaries 110, 120, 130, 140 are not planar reflection boundaries, such as when the CR reflection boundaries 110, 120, 130, 140 are curved. The object-side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the CR reflection boundaries 110, 120, 130, 140 has a length, a width and a height.

The CR reflection boundaries 110, 120, 130, 140 each have an outward facing reflection surface 112, 122, 132, 142 and an inward facing surface 114, 124, 134, 144, respectively. As used herein the phrase "outward facing surface" refers to a surface facing away from or distal from a cloaked region and the phrase "inward facing surface" refers to a surface that faces towards or is proximal to a cloaked region of a cloaking device. In embodiments, the inward facing surfaces 114, 124, 134, 144 may be an opaque surface that prevents light from within the cloaked region CR from propagating through the CR reflection boundaries 110, 120, 130, 140, respectively. The outward facing reflection surfaces 112, 122, 132, 142 may be made from, for example, omnidirectional photonic crystals or mirrors such that light incident on the outward facing reflection surfaces 112, 122, 132, 142 is reflected there from. In the alternative, one or more of the outward facing reflection surfaces 112, 122, 132, 142 may be a surface of a prism, e.g., a right angle prism, that totally internally reflects light incident on the surface. As used herein, the term "reflection surface" refers to a surface that reflects all modes of light (e.g. s-polarized light and p-polarized light) incident on the reflection surface. Also, as used herein the term "reflected there from" refers to at least 60% of incident light being reflected from a surface. In some embodiments, at least 70% of incident light is reflected from the surface, while in other embodiments at least 80% of incident light is reflected from the surface. In still other embodiments, at least 90% of incident light, for example at least 95% of incident light is reflected from the surface.

The CR reflection boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the CR reflection boundaries 110, 120, 130, 140 extend between the apex ends 116, 126, 136, 146 and the side ends 118, 128, 138, 148, respectively. In embodiments, the apex ends 116, 136 of the two object-side CR reflection boundaries 110, 130, respectively, meet or intersect at an apex 190. In the alternative or in addition to, the apex ends 126, 146 of the two image-side CR reflection boundaries 120, 140, respectively, meet or intersect at an apex 192. In such embodiments, the reference optical axis 16 bisects the apex 190 and the apex 192, and may be a centerline between a first side (+X direction) and a second side (−X direction) of the cloaking assembly 10. In other embodiments, the apex ends 116, 136 of the two object-side CR reflection boundaries 110, 130, respectively, are spaced apart (X direction) from each other and/or the apex ends 126, 146 of the two image-side CR reflection boundaries 120, 140, respectively, are spaced apart from each other such that an uncloaked region or gap (not shown) is present between the spaced apart apex ends 116, 136 and/or spaced apart apex ends 126, 146. In such embodiments, an image of the portion of the object O positioned above (+Y direction) the uncloaked region is not provided on the image-side 14 of the cloaking assembly 10. Also, in embodiments, the side end 118 may be positioned adjacent to and may be joined to side end 128 and the side end 138 may be positioned adjacent to and may be joined to side end 148 as depicted in FIG. 1A. In other embodiments, the side ends 118, 138 may be spaced apart (Y direction) from the side ends 128, 148 (not shown).

The two CR reflection boundaries 110, 130 may be positioned on the object-side 12 of the cloaking assembly 10 to face an object 'O' and may be referred to herein as object-side CR reflection boundaries 110, 130. Also, the object-side CR reflection boundary 110 is positioned on a first side (+X direction) of the reference optical axis 16 and may be referred to herein as a first object-side CR reflection boundary 110 and the object-side CR reflection boundary 130 is positioned on a second side (−X direction) of the reference optical axis 16 opposite the first side and may be referred to herein as a second object-side CR reflection boundary 130. The two CR reflection boundaries 120, 140 may be positioned on the image-side 14 of the cloaking assembly 10 to provide an image 'I' formed by the cloaking assembly 10 and may be referred to herein as image-side CR reflection boundaries 120, 140. The image-side CR reflection boundary 120 is positioned on the first side (+X direction) of the reference optical axis 16 and may be referred to herein as a first image-side CR reflection boundary 120 and the image-side CR reflection boundary 140 is positioned on the second side (−X direction) of the reference optical axis 16 opposite the first side and may be referred to herein as a second image-side CR reflection boundary 140.

In embodiments, the two object-side CR reflection boundaries 110, 130 and the two image-side CR reflection boundaries 120, 140 may be oriented at an acute angle (e.g., 45°) relative to the bisecting axis 15 and the reference optical axis 16, and form the cloaked region CR that is bound at least partly by the inward facing surfaces 114, 134, 124, 144, respectively. The two object-side CR reflection boundaries 110, 130 and the two image-side CR reflection boundaries 120, 140 have a height 'h' (FIG. 3) in the Z-direction of the coordinate axes in the figures and light reflected or transmitted within the cloaked region CR does not pass through the inward facing surfaces 114, 134, 124, 144. Accordingly, an article located within the cloaked region CR (e.g., a cloaked article) is not visible to an observer viewing the cloaking assembly 10 from the image-side 14 in the +Y direction.

Still referring to FIG. 1A, the cloaking assembly 10 may include four half-mirrors 152, 162, 172, 182 spaced apart from and positioned generally parallel (within +/−2°) with each of the CR reflection boundaries 110, 120, 130, 140, respectively. In embodiments, four multiband dichroic color filters 154, 164, 174, 184 may be included and may be spaced apart from and positioned generally parallel to each of the CR reflection boundaries 110, 120, 130, 140, respectively. As depicted in FIG. 1A, in embodiments, the multiband dichroic color filters 154, 164, 174, 184 may be co-planar with the half-mirrors 152, 162, 172, 182, respectively. In such embodiments, the half-mirrors 152, 162, 172, 182 may be positioned proximal to the reference optical axis 16 and the multiband dichroic color filters 154, 164, 174, 184 may be positioned distal to the reference optical axis 16 as depicted in FIG. 1A.

The two half-mirrors 152, 172 and the two multiband dichroic color filters 154, 174 may be positioned on the object-side 12 of the cloaking assembly 10 and may be referred to herein as object-side half-mirrors 152, 172 and object-side multiband dichroic color filters 154, 174, respectively. The object-side half-mirror 152 and the object-side multiband dichroic color filter 154 are positioned on the first side (+X direction) of the reference optical axis 16 and may be referred to herein as a first object-side half-mirror 152 and a first object-side multiband dichroic color filter 154, respectively. The object-side half-mirror 172 and the object-side multiband dichroic color filter 174 are positioned on the second side (−X direction) of the reference optical axis 16 opposite the first side and may be referred to herein as a second object-side half-mirror 172 and a second object-side multiband dichroic color filter 174, respectively. The two half-mirrors 162, 182 and the two multiband dichroic color filters 164, 184 may be positioned on the image-side 14 of the cloaking assembly 10 and may be referred to herein as image-side half-mirrors 162, 182 and image-side multiband dichroic color filters 164, 184, respectively. The image-side half-mirror 162 and the image-side multiband dichroic color filter 164 are positioned on the first side (+X direction) of the reference optical axis 16 and may be referred to herein as a first image-side half-mirror 162 and a first image-side multiband dichroic color filter 164, respectively. The image-side half-mirror 182 and the image-side multiband dichroic color filter 184 are positioned on the second side (−X direction) of the reference optical axis 16 opposite the first side and may be referred to herein as a second image-side half-mirror 182 and a second image-side multiband dichroic color filter 184, respectively.

The half-mirrors 152, 162, 172, 182 include a proximal end 152a, 162a, 172a, 182a, respectively, located proximal to the bisecting axis 15 and a distal end 152b, 162b, 172b, 182b, respectively, located distal from the bisecting axis 15. As used herein, the term "proximal end" refers to an end or edge of an optical component positioned proximal to a bisecting axis of a cloaking assembly (compared to a distal end of the optical component) and the term "distal end" refers to an end or edge of an optical component positioned distal from the bisecting axis of the cloaking assembly (compared to a proximal end of the optical component). The distal ends 152b, 162b, 172b, 182b are spaced apart from the proximal ends 152a, 162a, 172a, 182a, respectively, and the half-mirrors 152, 162, 172, 182 extend from the proximal ends 152a, 162a, 172a, 182a to the distal ends 152b, 162b, 172b, 182b, respectively. Also, the multiband dichroic color filters 154, 164, 174, 184 include a proximal end 154a, 164a, 174a, 184a, respectively, proximal to the bisecting axis 15 and a distal end 154b, 164b, 174b, 184b, respectively, distal from the bisecting axis 15. The distal ends 154b, 164b, 174b, 184b are spaced apart from the proximal ends 154a, 164a, 174a, 184a, respectively, and the multiband dichroic color filters 154, 164, 174, 184 extend from the proximal ends 154a, 164a, 174a, 184a to the distal ends 154b, 164b, 174b, 184b, respectively. In embodiments, the distal ends 154b, 164b, 174b, 184b of the multiband dichroic color filters 154, 164, 174, 184, respectively, are positioned in contact with the proximal ends 152a, 162a, 172a, 182a of the half-mirrors 152, 162, 172, 182, respectively. In such embodiments, the distal ends 154b, 164b, 174b, 184b of the multiband dichroic color filters 154, 164, 174, 184, respectively, may be attached to the proximal ends 152a, 162a, 172a, 182a of the half-mirrors 152, 162, 172, 182, respectively.

The half-mirrors 152, 162, 172, 182 reflect a specific mode of light. Specifically, each of the half-mirrors 152, 162, 172, 182 may be an s-polarizer half-mirror or a p-polarizer half-mirror. The half-mirrors 152, 162, 172, 182 may be in the form of a diffraction grating or thin film polarizer that reflects the s-mode of visible light and allows the p-mode of visible light to pass through (a p-polarization diffraction grating or thin film), or in the alternative, reflects the p-mode of visible light and allows the s-mode of visible light to pass through (an s-polarization diffraction grating or thin film). In embodiments, the half-mirrors 152, 162, 172, 182 are all p-polarizer half-mirrors or all s-polarizer half-mirrors. In other embodiments, the first side (+X direction) half-mirrors, i.e., half-mirrors 152, 162 are p-polarizer half-mirrors and the second side (−X direction) half-mirrors, i.e., the half-mirrors 172, 182 are s-polarizer half-mirrors. In still other embodiments, the first side (+X direction) half-mirrors, i.e., half-mirrors 152, 162 are s-polarizer half-mirrors and the second side (−X direction) half-mirrors, i.e., the half-mirrors 172, 182 are p-polarizer half-mirrors.

Figure 1B:
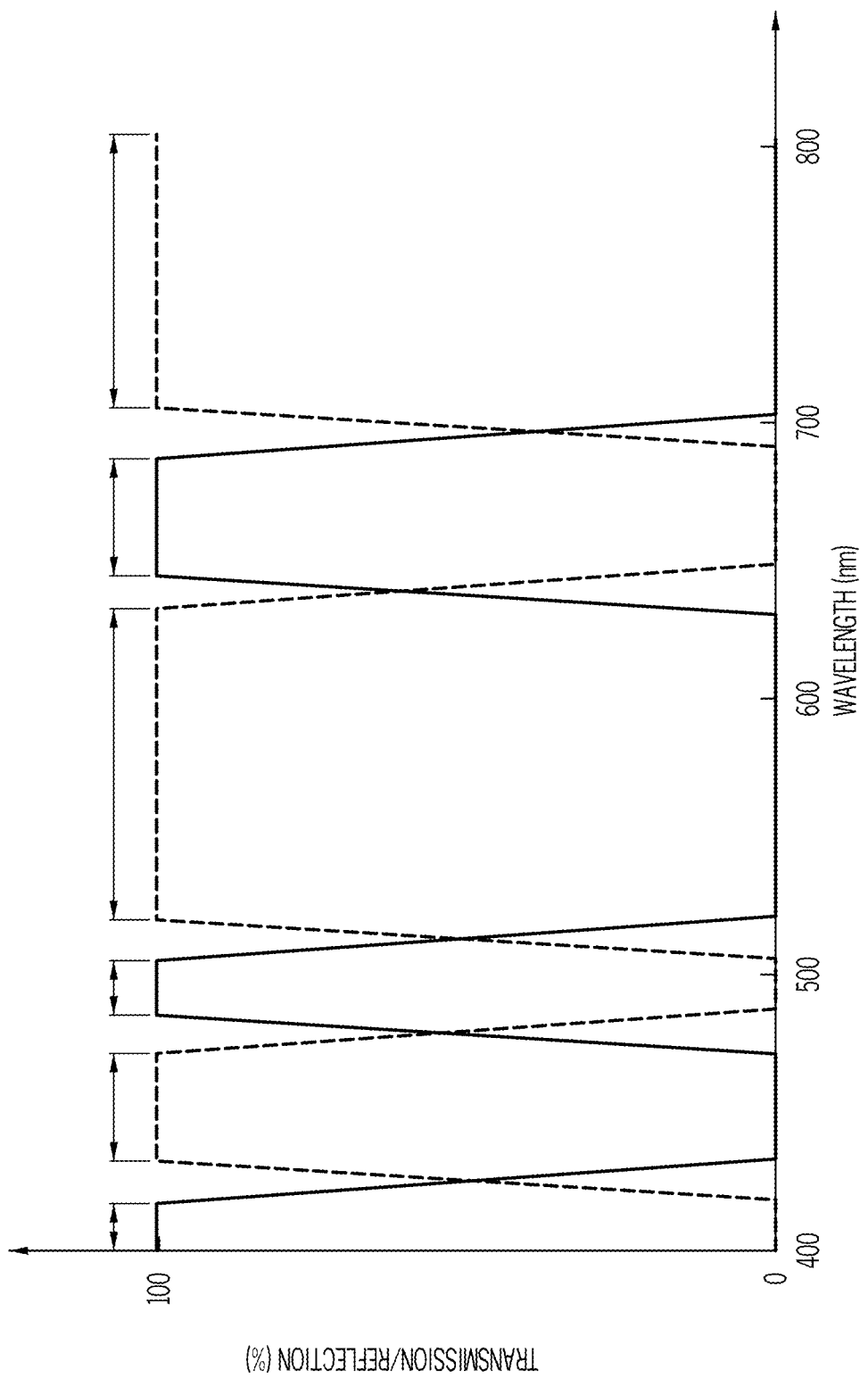
FIG. 1B graphically depicts a transmission and reflectance spectrum for a multiband dichroic color filter.

Referring now to FIG. 1B, a non-limiting example of a transmission spectrum (shown as solid line in FIG. 1B) and a reflectance spectrum (shown as dashed line in FIG. 1B) for the multiband dichroic color filters 154, 164, 174, 184 are graphically depicted. Particularly, the multiband dichroic color filters 154, 164, 174, 184 may transmit light with wavelengths of about 400-425 nm, 490-510 nm, and 625-675 nm, and reflect light with wavelengths of about 425-490 nm, 510-625 nm, and greater than 700 nm as graphically depicted in FIG. 1B. Accordingly, the multiband dichroic color filters 154, 164, 174, 184 transmit at least two separate ranges of visible light and reflect at least two separate ranges of visible light. The multiband dichroic color filters 154, 164, 174, 184 may also transmit and/or reflect portions of the ultraviolet and/or infrared electromagnetic radiation spectrum.

In embodiments, the ranges of wavelengths transmitted by the multiband dichroic color filters 154, 164, 174, 184 provide a neutral color on the image-side 14 of the cloaking device 10. As used herein, the term "neutral color" refers to a color formed by a range of colors within the visible light spectrum such as beige, gray, and shades of white. Accordingly, an image of an object on the object-side 12 of the cloaking device provided and seen by an observer on the image-side 14 has a neutral color rather than one or more individual colors such as blue, green, red, etc. That is, the image on the image-side 14 of the cloaking device 10 does not appear to an observer as a distinct color such as blue, green, red, etc., or a rainbow of colors, but rather as a blend of colors that has an appearance of beige, gray, a shade of white, etc.

It should be understood that multiband dichroic color filters that transmit other colors may be included and used with the cloaking devices described and illustrated herein such that a neutral color is provided on the image-side 14 of the cloaking device 10. In embodiments, the multiband dichroic color filters 154, 164, 174, 184 all transmit and reflect the same colors. In other embodiments, the first side (+X direction) multiband dichroic color filters, i.e., multiband dichroic color filters 154, 164 transmit a first set of colors and the second side (−X direction) multiband dichroic color filters, i.e., the multiband dichroic color filters 174, 184 transmit a second set of colors that are different than the first set of colors.

Figure 1C:
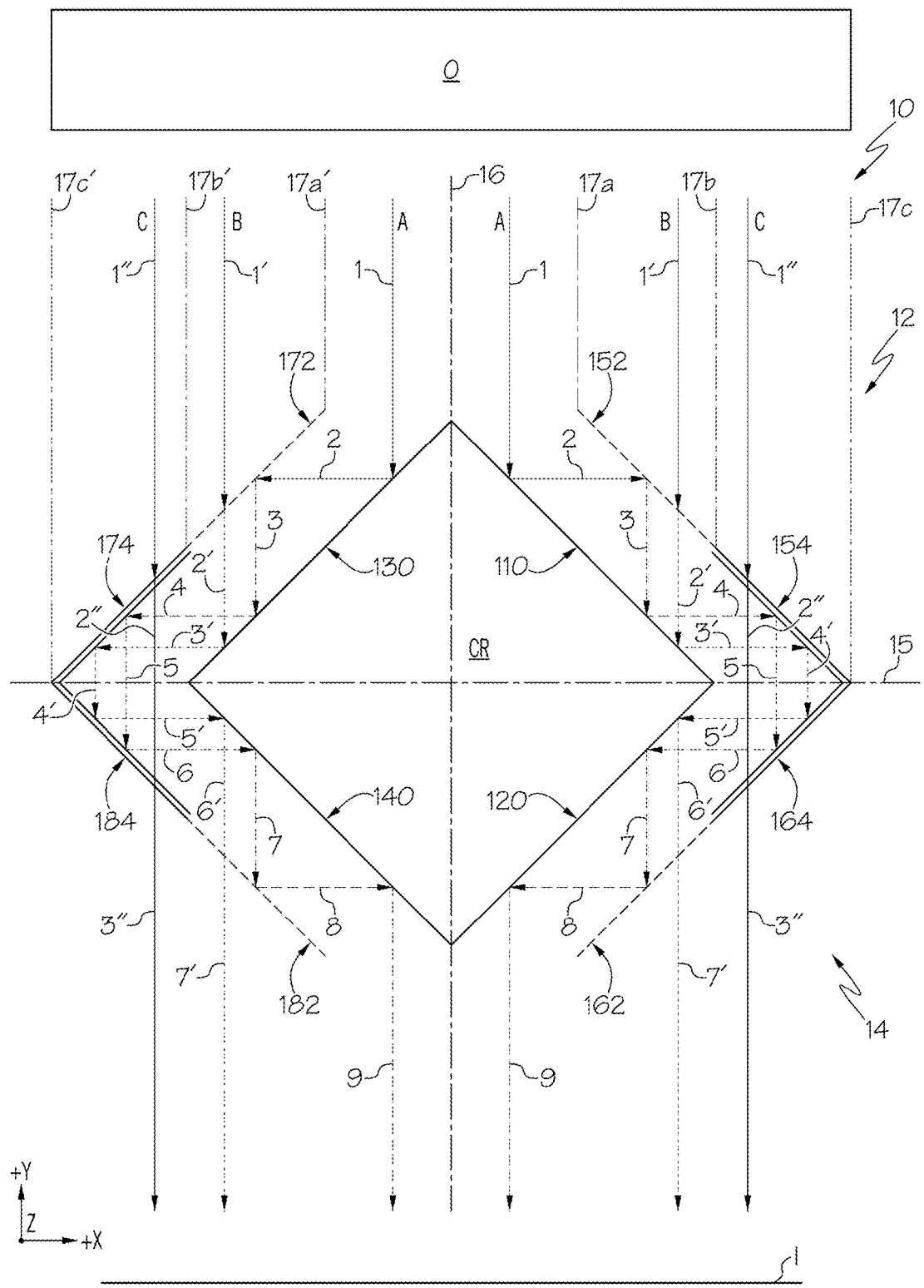
FIG. 1C schematically depicts a top view of the cloaking assembly of FIG. 1A with light propagating from an object on an object-side of the cloaking assembly to form an image on an image-side of the cloaking assembly via three optical paths.

Referring now to FIGS. 1A and 1C, the cloaking assembly 10 includes three optical paths for light from an object 'O' positioned on the object-side 12 to propagate and form an image T on the image-side 14 on the first side (+X direction) of the reference optical axis 16. The cloaking assembly 10 may also include three optical paths for light from an object 'O' positioned on the object-side 12 to propagate and form an image T on the image-side 14 on the second side (−X direction) of the reference optical axis 16. Regarding the three optical paths on the first side (+X direction) of the reference optical axis 16, light from the object O incident on the cloaking assembly 10 between the reference optical axis 16 and a first optical path transition axis 17a propagates via an optical path 'A'. Light from the object O incident on the cloaking assembly 10 between the first optical path transition axis 17a and a second optical path transition axis 17b propagates via an optical path 'B'. Light from the object O incident on the cloaking assembly 10 between the second optical path transition axis 17b and a third optical path transition axis 17c propagates via an optical path 'C'.

The first optical path transition axis 17a extends parallel to the Y-axis in the figures from the distal end 152b (FIG. 1A) of the first object-side half-mirror 152 to the object O. Accordingly, light propagating via optical path A is incident on the first object-side CR reflection boundary 110. The second optical path transition axis 17b extends parallel to the Y-axis from the distal end 154b (FIG. 1A) of the first object-side multiband dichroic color filter 154 to object O. Accordingly, light propagating via optical path B is incident on the first object-side half-mirror 152. The third optical path transition axis 17c extends parallel to the Y-axis from the proximal end 154a (FIG. 1A) of the first object-side multiband dichroic color filter 154 to the object O. Accordingly, light propagating via optical path C is incident on the first object-side multiband dichroic color filter 154.

Regarding the first optical path A on the first side (+X direction) of the reference optical axis 16, light from the object O positioned above (+Y direction) the cloaking assembly 10 between the reference optical axis 16 and the first optical path transition axis 17a is incident on the first object-side CR reflection boundary 110 (shown as arrow '1' in FIG. 1C) where it is reflected by the outward facing reflection surface 112 (FIG. 1A) as light 2. The first object-side CR reflection boundary 110 is positioned relative to the first object-side half-mirror 152 such that light 2 reflected by the outward facing reflection surface 112 of the first object-side CR reflection boundary 110 is incident on the first object-side half-mirror 152. Light 2 is polarized by the first object-side half-mirror 152 such that one mode of light 2 is reflected by the first object-side half-mirror 152 and another mode of light 2 is transmitted through the first object-side half-mirror 152 (not shown). A non-limiting example of the first object-side half-mirror 152 in the form of a p-polarization half-mirror is depicted in FIG. 1C. Accordingly, the s-mode of light 2 is reflected by the first object-side half-mirror 152 as s-polarized light 3 (shown as a dashed line in the figures). The first object-side half-mirror 152 is positioned relative to the first object-side CR reflection boundary 110 such that s-polarized light 3 is reflected by the first object-side half-mirror 152 onto the outward facing reflection surface 112 of the first object-side CR reflection boundary 110 where it is reflected as s-polarized light 4. The first object-side CR reflection boundary 110 is positioned relative to the first object-side multiband dichroic color filter 154 such that s-polarized light 4 is reflected by the outward facing reflection surface 112 onto the first object-side multiband dichroic color filter 154. At least two separate ranges of wavelengths of the s-polarized light 4 are transmitted through the first object-side multiband dichroic color filter 154 (not shown) and at least two separate ranges of wavelengths of the s-polarized light 4 are reflected by the first object-side multiband dichroic color filter 154 (shown as arrow '5' in FIG. 1C and referred to herein as 'selective s-polarized light 5'). Particularly, the first object-side multiband dichroic color filter 154 with the transmission and reflectance spectra depicted in FIG. 1B transmits light with wavelengths of about 400-425 nm, 490-510 nm, and 625-675 nm, and reflects light with wavelengths of about 425-490 nm, 510-625 nm, and greater than 700 nm.

The first object-side multiband dichroic color filter 154 is positioned relative to the first image-side multiband dichroic color filter 164 such that selective s-polarized light 5 is reflected by the first object-side multiband dichroic color filter 154 onto the first image-side multiband dichroic color filter 164. As noted above, the first image-side multiband dichroic color filter 164 is the same type (colors) of multiband dichroic color filter as the first object-side multiband dichroic color filter 154. Accordingly, selective s-polarized light 5 is reflected by the first image-side multiband dichroic color filter 164 as selective s-polarized light 6. The first image-side multiband dichroic color filter 164 is positioned relative to the first image-side CR reflection boundary 120 such that selective s-polarized light 6 is reflected by the first image-side multiband dichroic color filter 164 onto the outward facing reflection surface 122 (FIG. 1A) where it is reflected as selective s-polarized light 7. The first image-side CR reflection boundary 120 is positioned relative to the first image-side half-mirror 162 such that selective s-polarized light 7 is reflected by the outward facing reflection surface 122 onto the first image-side half-mirror 162. As noted above, the first-image-side half-mirror 162 is the same type of half-mirror as the first object-side half-mirror 152. Accordingly, selective s-polarized light 7 is reflected by the first image-side half-mirror 162 as selective s-polarized light 8. The first image-side half-mirror 162 is positioned relative to the first image-side CR reflection boundary 120 such that selective s-polarized light 8 is reflected by the first image-side half-mirror 162 onto the outward facing reflection surface 122 where it is reflected as selective s-polarized light 9 generally parallel to light 1 and forms a portion of the image I on the image-side 14 of the cloaking assembly 10.

Accordingly, light from the object O may travel from the object-side 12 to the image-side 14 via the first optical path A: object O—first object-side CR reflection boundary 110—first object-side half-mirror 152—first object-side CR reflection boundary 110—first object-side multiband dichroic color filter 154—first image-side multiband dichroic color filter 164—first image-side CR reflection boundary 120—first image-side half-mirror 162—first image-side CR reflection boundary 120—image I. That is, light from the object O may travel from the object-side 12 to the image-side 14 via the first optical path A: object O—reflection from first object-side CR reflection boundary 110—reflection from first object-side half-mirror 152—reflection from first object-side CR reflection boundary 110—reflection from first object-side multiband dichroic color filter 154—reflection from first image-side multiband dichroic color filter 164—reflection from first image-side CR reflection boundary 120—reflection from first image-side half-mirror 162—reflection from first image-side CR reflection boundary 120—image I.

It should be understood that the portion of the image I on the image-side 14 of the cloaking device 10 formed by light with the optical path A has a color formed by the combination of wavelength ranges reflected by the first object-side and first image-side multiband dichroic color filters 154, 164. Particularly, and for the non-limiting example of the first object-side and first image-side multiband dichroic color filters 154, 164 with transmission and reflectance spectra graphically depicted in FIG. 1B, the portion of the image I on the image-side 14 of the cloaking device 10 formed by light with the optical path A has a color formed by the combination of light with wavelengths of about 425-490 nm, 510-625 nm, and greater than 700 nm.

Still referring to FIGS. 1A and 1C, and regarding the second optical path B on the first side (+X direction) of the reference optical axis 16, light from the object O positioned above (+Y direction) the cloaking assembly 10 between the first optical path transition axis 17a and the second optical path transition axis 17b is incident on the first object-side half-mirror 152 (shown as arrow '1" in FIG. 1C). As noted above, a non-limiting example of the first object-side half-mirror 152 in the form of a p-polarization half-mirror is depicted in FIG. 1C. Accordingly, p-polarized light (shown as a short-dash line in the figures in contrast to a long-dash line for s-polarized light) is transmitted through the first object-side half-mirror 152 as p-polarized light 2'. The first object-side half-mirror 152 is positioned relative to the first object-side CR reflection boundary 110 such that p-polarized light 2' transmitted through the first object-side half-mirror 152 is incident on the first object-side CR reflection boundary 110 where it is reflected by the outward facing reflection surface 112 (FIG. 1A) as p-polarized light 3'. The first object-side CR reflection boundary 110 is positioned relative to the first object-side multiband dichroic color filter 154 such that p-polarized light 3' reflected by the outward facing reflection surface 112 is incident on the first object-side multiband dichroic color filter 154. The at least two separate ranges of wavelengths of the p-polarized light 3' are transmitted through the first object-side multiband dichroic color filter 154 (not shown) and the at least two separate ranges of wavelengths of the p-polarized light are reflected by the first object-side multiband dichroic color filter 154 (shown as arrow '4'" in FIG. 1C and referred to herein as 'selective p-polarized light 4'"). The first object-side multiband dichroic color filter 154 is positioned relative to the first image-side multiband dichroic color filter 164 such that selective p-polarized light 4' reflected by the first object-side multiband dichroic color filter 154 is incident on the first image-side multiband dichroic color filter 164 where it is reflected as selective p-polarized light 5'. The first image-side multiband dichroic color filter 164 is positioned relative to the first image-side CR reflection boundary 120 such that selective p-polarized light 5' reflected by the first image-side multiband dichroic color filter 164 is incident on the outward facing reflection surface 122 (FIG. 1A) where it is reflected as selective p-polarized light 6'. The first image-side CR reflection boundary 120 is positioned relative to the first image-side half-mirror 162 such that selective p-polarized light 6' reflected by the outward facing reflection surface 122 is incident on the first image-side half-mirror 162. As noted above, the first-image-side half-mirror 162 is the same type of half-mirror as the first object-side half-mirror 152. Accordingly, selective p-polarized light 6' is transmitted through the first image-side half-mirror 162 as selective p-polarized light 7' and forms a portion of the image I on the image-side 14 of the cloaking assembly 10.

Accordingly, light from the object O may travel from the object-side 12 to the image-side 14 via the second optical path B: object O—first object-side half-mirror 152—first object-side CR reflection boundary 110—first object-side multiband dichroic color filter 154—first image-side multiband dichroic color filter 164—first image-side CR reflection boundary 120—first image-side half-mirror 162—image I. That is, light from the object O may travel from the object-side 12 to the image-side 14 via the second optical path B: object O—transmittance through first object-side half-mirror 152—reflection from first object-side CR reflection boundary 110—reflection from first object-side multiband dichroic color filter 154—reflection from first image-side multiband dichroic color filter 164—reflection from first image-side CR reflection boundary 120—transmittance through first image-side half-mirror 162—image I.

Similar to the portion of the image I on the image-side 14 of the cloaking device 10 formed by light with the optical path A, it should be understood that the portion of the image I formed by light with the optical path B has a color formed by the combination of wavelength ranges reflected by the first object-side and first image-side multiband dichroic color filters 154, 164. Particularly, and for the non-limiting example of the first object-side and first image-side multiband dichroic color filters 154, 164 with transmission and reflectance spectra graphically depicted in FIG. 1B, the portion of the image I on the image-side 14 of the cloaking device 10 formed by light with the optical path B has a color formed by the combination of light with wavelengths of about 425-490 nm, 510-625 nm, and greater than 700 nm.

Regarding the third optical path C on the first side (+X direction) of the reference optical axis 16, light from the object O positioned above (+Y direction) the cloaking assembly 10 between the second optical path transition axis 17b and the third optical path transition axis 17c is incident on the first object-side multiband dichroic color filter 154 (shown as arrow '1'" in FIG. 1C). The at least two separate ranges of wavelengths of light 1" are transmitted through the first object-side multiband dichroic color filter 154 as selective light 2". The first object-side multiband dichroic color filter 154 is positioned relative to the first image-side multiband dichroic color filter 164 such that selective light 2" transmitted through the first object-side multiband dichroic color filter 154 is incident on the first image-side multiband dichroic color filter 164 where it is transmitted through as selective light 3". Selective light 3" is generally parallel to light 1" and forms a portion of the image I on the image-side 14 of the cloaking assembly 10. Accordingly, light from the object O may travel from the object-side 12 to the image-side 14 via the third optical path C: object O—first object-side multiband dichroic color filter 154—first image-side multiband dichroic color filter 164—image I. That is, light from the object O may travel from the object-side 12 to the image-side 14 via the third optical path C object O—transmittance through first object-side multiband dichroic color filter 154—transmittance through first image-side multiband dichroic color filter 164—image I.

It should be understood that the portion of the image I on the image-side 14 of the cloaking device 10 formed by light with the optical path C has a color formed by the combination of wavelength ranges transmitted through the first object-side and first image-side multiband dichroic color filters 154, 164. Particularly, and for the non-limiting example of the first object-side and first image-side multiband dichroic color filters 154, 164 with transmission and reflectance spectra graphically depicted in FIG. 1B, the portion of the image I on the image-side 14 of the cloaking device 10 formed by light with the optical path C has a color formed by the combination of light with wavelengths of about 400-425 nm, 490-510 nm, and 625-675 nm.

Still referring to FIGS. 1A and 1C, and regarding the three optical paths on the second side (−X direction) of the reference optical axis 16, light from the object O incident on the cloaking assembly 10 between the reference optical axis 16 and a first optical path transition axis 17*a*" propagates via an optical path 'A'. Light from the object O incident on the cloaking assembly 10 between the first optical path transition axis 17*a*" and a second optical path transition axis 17*b*' propagates via an optical path 'B'. Light from the object O positioned above (+Y direction) the cloaking assembly 10 between the second optical path transition axis 17*b*' and a third optical path transition axis 17*c*' propagates via an optical path 'C'.

The first optical path transition axis 17*a*' extends parallel to the Y-axis in the figures from the distal end 172*b* (FIG. 1A) of the second object-side half-mirror 172 to the object O. Accordingly, light propagating via optical path A on the second side (−X direction) of the reference optical axis 16 is incident on the second object-side CR reflection boundary 130. The second optical path transition axis 17*b*' extends parallel to the Y-axis from the distal end 174*b* (FIG. 1A) of the second object-side multiband dichroic color filter 174 to object O. Accordingly, light propagating via optical path B on the second side (−X direction) of the reference optical axis 16 is incident on the second object-side half-mirror 172. The third optical path transition axis 17*c*' extends parallel to the Y-axis from the proximal end 174*a* (FIG. 1A) of the second object-side multiband dichroic color filter 174 to the object O. Accordingly, light propagating via optical path C on the second side (−X direction) of the reference optical axis 16 is incident on the second object-side multiband dichroic color filter 174.

Regarding the first optical path A on the second side (−X direction) of the reference optical axis 16, light from the object O positioned above (+Y direction) the cloaking assembly 10 between the reference optical axis 16 and the first optical path transition axis 17*a*' is incident on the second object-side CR reflection boundary 130 (shown as arrow '1' in FIG. 1C) where it is reflected by the outward facing reflection surface 132 (FIG. 1A) as light 2. The second object-side CR reflection boundary 130 is positioned relative to the second object-side half-mirror 172 such that light 2 reflected by the outward facing reflection surface 132 of the second object-side CR reflection boundary 130 is incident on the second object-side half-mirror 172. Light 2 is polarized by the second object-side half-mirror 172 such that one mode of light 2 is reflected by the second object-side half-mirror 172 and another mode of light 2 is transmitted through the second object-side half-mirror 172 (not shown).

A non-limiting example of the second object-side half-mirror 172 in the form of a p-polarization half-mirror is depicted in FIG. 1C. Accordingly, the s-mode of light 2 is reflected by the second object-side half-mirror 172 as s-polarized light 3 (shown as a dashed line in the figures). The second object-side half-mirror 172 is positioned relative to the second object-side CR reflection boundary 130 such that s-polarized light 3 is reflected by the second object-side half-mirror 172 onto the outward facing reflection surface 132 of the second object-side CR reflection boundary 130 where it is reflected as s-polarized light 4. The second object-side CR reflection boundary 130 is positioned relative to the second object-side multiband dichroic color filter 174 such that s-polarized light 4 is reflected by the outward facing reflection surface 132 onto the second object-side multiband dichroic color filter 174. At least two separate ranges of wavelengths of the s-polarized light 4 are transmitted through the second object-side multiband dichroic color filter 174 (not shown) and at least two separate ranges of wavelengths of the s-polarized light 4 are reflected by the second object-side multiband dichroic color filter 174 (shown as arrow '5' in FIG. 1C and referred to herein as 'selective s-polarized light 5'). The second object-side multiband dichroic color filter 174 is positioned relative to the second image-side multiband dichroic color filter 184 such that selective s-polarized light 5 is reflected by the second object-side multiband dichroic color filter 174 onto the second image-side multiband dichroic color filter 184. As noted above, the second image-side multiband dichroic color filter 184 is the same type (colors) of multiband dichroic color filter as the second object-side multiband dichroic color filter 174. Accordingly, selective s-polarized light 5 is reflected by the second image-side multiband dichroic color filter 184 as selective s-polarized light 6. The second image-side multiband dichroic color filter 184 is positioned relative to the second image-side CR reflection boundary 140 such that selective s-polarized light 6 is reflected by the second image-side multiband dichroic color filter 184 onto the outward facing reflection surface 142 (FIG. 1A) where it is reflected as selective s-polarized light 7. The second image-side CR reflection boundary 140 is positioned relative to the second image-side half-mirror 182 such that selective s-polarized light 7 is reflected by the outward facing reflection surface 142 onto the second image-side half-mirror 182. As noted above, the second-image-side half-mirror 182 is the same type of half-mirror as the second object-side half-mirror 172. Accordingly, selective s-polarized light 7 is reflected by the second image-side half-mirror 182 as selective s-polarized light 8. The second image-side half-mirror 182 is positioned relative to the second image-side CR reflection boundary 140 such that selective s-polarized light 8 is reflected by the second image-side half-mirror 182 onto the outward facing reflection surface 142 where it is reflected as selective s-polarized light 9 generally parallel to light 1 and forms a portion of the image I on the image-side 14 of the cloaking assembly 10.

Accordingly, light from the object O on the second side (−X direction) of the reference optical axis 16 may travel from the object-side 12 to the image-side 14 via the first optical path A: object O—second object-side CR reflection boundary 130—second object-side half-mirror 172—second object-side CR reflection boundary 130—second object-side multiband dichroic color filter 174—second image-side multiband dichroic color filter 184—second image-side CR reflection boundary 140—second image-side half-mirror 182—second image-side CR reflection boundary 140—image I. That is, light from the object O on the second side (−X direction) of the reference optical axis 16 may travel from the object-side 12 to the image-side 14 via the first optical path A: object O—reflection from second object-side CR reflection boundary 130—reflection from second object-side half-mirror 172—reflection from second object-side CR reflection boundary 130—reflection from second object-side multiband dichroic color filter 174 reflection from second image-side multiband dichroic color filter 184—reflection from second image-side CR reflection boundary 140—reflection from second image-side half-mirror 182—reflection from second image-side CR reflection boundary 140—image I.

It should be understood that the portion of the image I on the image-side 14 of the cloaking device 10 formed by light with the optical path A on the second side (−X direction) has a color formed by the combination of wavelength ranges reflected by the second object-side and second image-side multiband dichroic color filters 174, 184. Particularly, and for the non-limiting example of the second object-side and second image-side multiband dichroic color filters 174, 184 with transmission and reflectance spectra graphically depicted in FIG. 1B, the portion of the image I on the image-side 14 of the cloaking device 10 formed by light with the optical path A on the second side (−X direction) of the reference optical axis 16 has a color formed by the combination of light with wavelengths of about 425-490 nm, 510-625 nm, and greater than 700 nm.

Regarding the second optical path B on the second side (−X direction) of the reference optical axis 16, light from the object O positioned above (+Y direction) the cloaking assembly 10 between the first optical path transition axis 17a' and the second optical path transition axis 17b' is incident on the second object-side half-mirror 172 (shown as arrow '1'' in FIG. 1C). As noted above, a non-limiting example of the second object-side half-mirror 172 in the form of a p-polarization half-mirror is depicted in FIG. 1C. Accordingly, p-polarized light (shown as a short-dash line in the figures in contrast to a long-dash line for s-polarized light) is transmitted through the second object-side half-mirror 172 as p-polarized light 2'. The second object-side half-mirror 172 is positioned relative to the second object-side CR reflection boundary 130 such that p-polarized light 2' transmitted through the second object-side half-mirror 172 is incident on the second object-side CR reflection boundary 130 where it is reflected by the outward facing reflection surface 132 (FIG. 1A) as p-polarized light 3'. The second object-side CR reflection boundary 130 is positioned relative to the second object-side multiband dichroic color filter 174 such that p-polarized light 3' reflected by the outward facing reflection surface 132 is incident on the second object-side multiband dichroic color filter 174. The at least two separate ranges of wavelengths of the p-polarized light 3' are transmitted through the second object-side multiband dichroic color filter 174 (not shown) and the at least two separate ranges of wavelengths of the p-polarized light are reflected by the second object-side multiband dichroic color filter 174 (shown as arrow '4'' in FIG. 1C and referred to herein as 'selective p-polarized light 4''). The second object-side multiband dichroic color filter 174 is positioned relative to the second image-side multiband dichroic color filter 184 such that selective p-polarized light 4' reflected by the second object-side multiband dichroic color filter 174 is incident on the second image-side multiband dichroic color filter 184 where it is reflected as selective p-polarized light 5'. The second image-side multiband dichroic color filter 184 is positioned relative to the second image-side CR reflection boundary 140 such that selective p-polarized light 5' reflected by the second image-side multiband dichroic color filter 184 is incident on the outward facing reflection surface 142 (FIG. 1A) where it is reflected as selective p-polarized light 6'. The second image-side CR reflection boundary 140 is positioned relative to the second image-side half-mirror 182 such that selective p-polarized light 6' reflected by the outward facing reflection surface 142 is incident on the second image-side half-mirror 182. As noted above, the second-image-side half-mirror 182 is the same type of half-mirror as the second object-side half-mirror 172. Accordingly, selective p-polarized light 6' is transmitted through the second image-side half-mirror 182 as selective p-polarized light 7' and forms a portion of the image I on the image-side 14 of the cloaking assembly 10.

Accordingly, light from the object O on the second side (−X direction) of the reference optical axis 16 may travel from the object-side 12 to the image-side 14 via the second optical path B: object O—second object-side half-mirror 172—second object-side CR reflection boundary 130—second object-side multiband dichroic color filter 174—second image-side multiband dichroic color filter 184—second image-side CR reflection boundary 140—second image-side half-mirror 182—image I. That is, light from the object O on the second side (−X direction) of the reference optical axis 16 may travel from the object-side 12 to the image-side 14 via the second optical path D: object O—transmittance through second object-side half-mirror 172—reflection from second object-side CR reflection boundary 130—reflection from second object-side multiband dichroic color filter 174—reflection from second image-side multiband dichroic color filter 184—reflection from second image-side CR reflection boundary 140—transmittance through second image-side half-mirror 182—image I.

Similar to the portion of the image I formed by light with the optical path A on the second side (−X direction) of the reference optical axis 16, it should be understood that the portion of the image I formed by light with the optical path B on the second side (−X direction) has a color formed by the combination of wavelength ranges reflected by the second object-side and second image-side multiband dichroic color filters 174, 184. Particularly, and for the non-limiting example of the second object-side and second image-side multiband dichroic color filters 174, 184 with transmission and reflectance spectra graphically depicted in FIG. 1B, the portion of the image I on the image-side 14 of the cloaking device 10 formed by light with the optical path B on the second side (−X direction) of the reference optical axis 16 has a color formed by the combination of light with wavelengths of about 425-490 nm, 510-625 nm, and greater than 700 nm.

Regarding the third optical path C on the second side (−X direction) of the reference optical axis 16, light from the object O positioned above (+Y direction) the cloaking assembly 10 between the second optical path transition axis 17b" and the third optical path transition axis 17c" is incident on the second object-side multiband dichroic color filter 174 (shown as arrow '1''' in FIG. 1C). The first range of wavelengths of light 1" is transmitted through the second object-side multiband dichroic color filter 174 as selective light 2". The second object-side multiband dichroic color filter 174 is positioned relative to the second image-side multiband dichroic color filter 184 such that selective light 2" transmitted through the second object-side multiband dichroic color filter 174 is incident on the second image-side multiband dichroic color filter 184 where it is transmitted through as selective light 3". Selective light 3" is generally parallel to light 1" and forms a portion of the image I on the image-side 14 of the cloaking assembly 10.

Accordingly, light from the object O may travel from the object-side 12 to the image-side 14 via the third optical path C: object O—second object-side multiband dichroic color filter 174—second image-side multiband dichroic color filter 184—image I. That is, light from the object O may travel from the object-side 12 to the image-side 14 via the second optical path D: object O—transmittance through second object-side multiband dichroic color filter 174—transmittance through second image-side multiband dichroic color filter 184—image I.

It should be understood that the portion of the image I on the image-side 14 of the cloaking device 10 formed by light with the optical path C on the second side (−X direction) of the reference optical axis 16 has a color formed by the combination of wavelength ranges transmitted by the second object-side and second image-side multiband dichroic color filters 174, 184. Particularly, and for the non-limiting example of the second object-side and second image-side multiband dichroic color filters 174, 184 with transmission and reflectance spectra graphically depicted in FIG. 1B, the portion of the image I on the image-side 14 of the cloaking device 10 formed by light with the optical path C on the second side (−X direction) of the reference optical axis 16 has a color formed by the combination of light with wavelengths of about 400-425 nm, 490-510 nm, and 625-675 nm.

In combination, i.e., light 1 on the first side (+X direction) and the second side (−X direction) of the reference optical axis 16 from the object O on the object-side 12 of the cloaking assembly 10 propagates to the image-side 14 via the first optical paths A: object O—reflection from first and second object-side CR reflection boundaries 110, 130—reflection from first and second object-side half-mirrors 152, 172—reflection from first and second object-side CR reflection boundaries 110, 130—reflection from first and second object-side multiband dichroic color filters 154, 174—reflection from first and second image-side multiband dichroic color filters 164, 184—reflection from first and second image-side CR reflection boundaries 120, 140—reflection from first and second image-side half-mirrors 162, 182—reflection from first and second image-side CR reflection boundaries 120, 140—image I. Light 1" on the first side (+X direction) and the second side (−X direction) of the reference optical axis 16 from the object O on the object-side 12 of the cloaking assembly 10 propagates to the image-side 14 via the second optical paths B: object O—transmittance through first and second object-side half-mirrors 152, 172—reflection from first and second object-side CR reflection boundaries 110, 130, respectively—reflection from first and second object-side multiband dichroic color filters 154, 174—reflection from first and second image-side multiband dichroic color filters 164, 184—reflection from first and second image-side CR reflection boundaries 120, 140—transmittance through first and second image-side half-mirrors 162, 182—image I. Light 1" on the first side (+X direction) and the second side (−X direction) of the reference optical axis 16 from the object O on the object-side 12 of the cloaking assembly 10 propagates to the image-side 14 via the third optical paths C: object O—transmittance through first and second object-side multiband dichroic color filters 154, 174—transmittance through first and second image-side multiband dichroic color filters 164, 184—image I.

While FIGS. 1A and 1C depict the CR reflection boundaries 110, 120, 130, 140, the half-mirrors 152, 162, 172, 182, and the multiband dichroic color filters 154, 164, 174, 184 as stand-alone components, it should be understood that the CR reflection boundaries 110, 120, 130, 140, the half-mirrors 152, 162, 172, 182, and the multiband dichroic color filters 154, 164, 174, 184 may be provided as a single unit or a plurality of assembled units. For example, the CR reflection boundaries 110, 120, 130, 140, the half-mirrors 152, 162, 172, 182, and the multiband dichroic color filters 154, 164, 174, 184 may be formed from a plurality of prisms that comprise the CR reflection boundaries 110, 120, 130, 140, the half-mirrors 152, 162, 172, 182, and the multiband dichroic color filters 154, 164, 174, 184. In contrast, or in addition to, the half-mirrors 152, 162, 172, 182 may be in the form of wire-grid polarizer—cube beamsplitters (not shown). It should also be understood that the cloaking assembly 10 may cloak an object within the cloaked region CR including only the first object-side and image-side CR reflection boundaries 110, 120, the first object-side and image-side half-mirrors 152, 162, and the first object-side and image-side multiband dichroic color filters 154, 164. That is, an object positioned on the first side (+X direction) of the reference optical axis 16 within the cloaked region CR would be cloaked by the first object-side and image-side CR reflection boundaries 110, 120, first object-side and image-side half-mirrors 152, 162, and first object-side and image-side multiband dichroic color filters 154, 164. In the alternative, an object positioned on the second side (−X direction) of the reference optical axis 16 within the cloaked region CR would be cloaked by the second object-side and image-side CR reflection boundaries 130, 140, second object-side and image-side half-mirrors 172, 182, and second object-side and image-side multiband dichroic color filters 174, 184.

Figure 2:
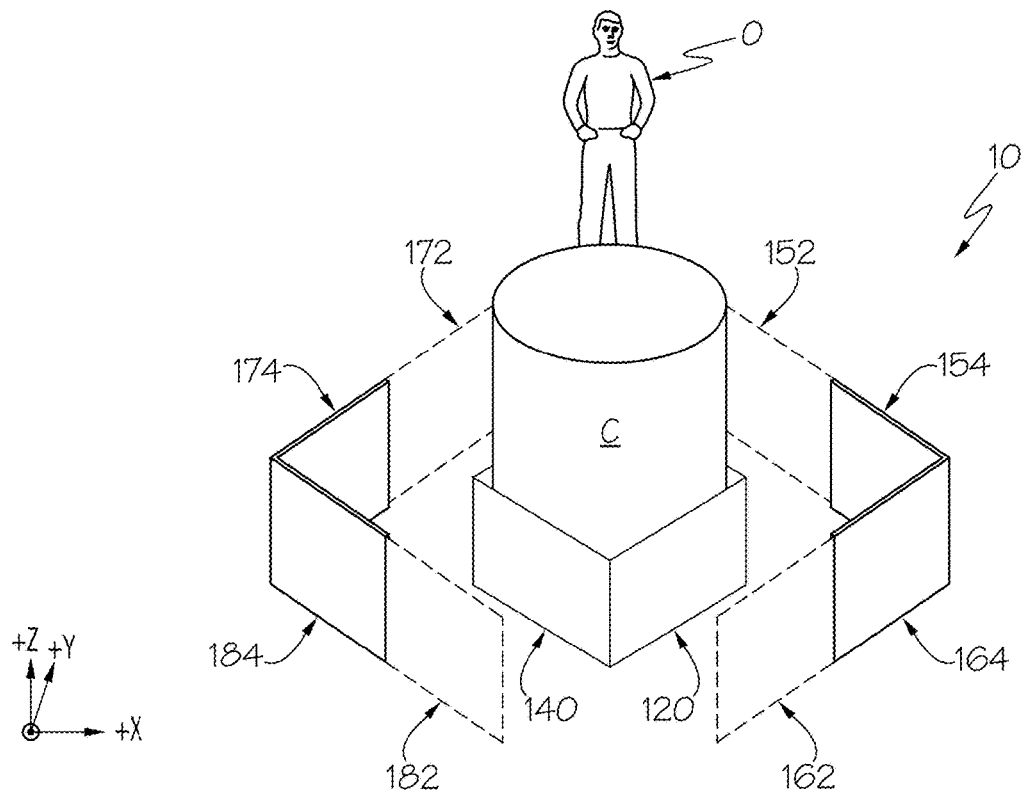
FIG. 2 schematically depicts a top perspective view of the cloaking assembly of FIG. 1A with a first object on one side of the cloaking device and a second object within a cloaked region of the cloaking device.
Figure 3:
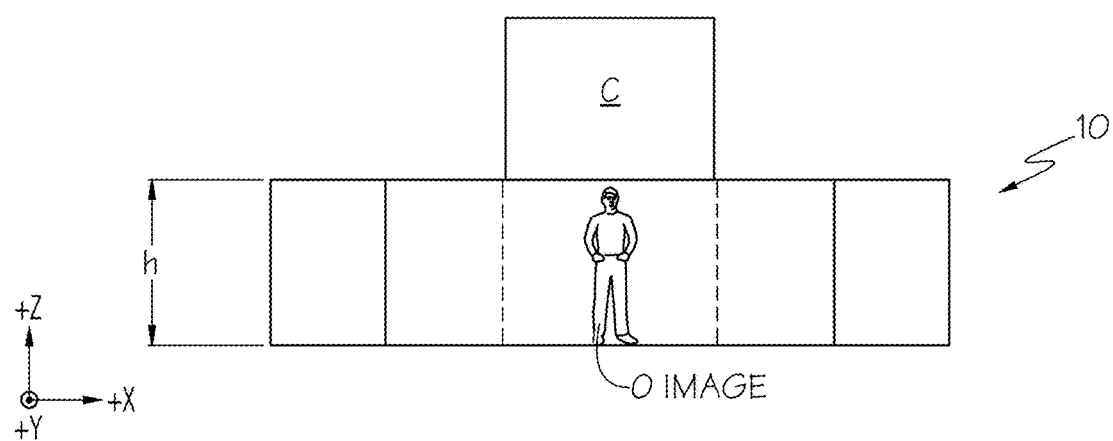
FIG. 3 schematically depicts a side view of the cloaking assembly of FIG. 2 with the first object on one side of the cloaking device and the second object within the cloaked region of the cloaking device.

Referring now to FIGS. 1A-3, a top perspective view and a side view of cloaking devices according to embodiments described herein are shown in FIGS. 2 and 3. Particularly, FIG. 2 is a top perspective view of an article in the form of a column 'C' within the cloaked region CR of the cloaking assembly 10 (FIG. 1A) and an object 'O' (e.g., a person) located behind the column C on the object-side 12 of the cloaking assembly 10 in the +Y direction. The column C has a height dimension in the Z direction (increasing height in the +Z direction) greater than the height h of the cloaking device (FIG. 3). FIG. 3 is a side view from the +Y direction of the cloaking assembly 10 shown in FIG. 2 and shows the portion of the column C that is within the cloaked region CR is not visible and the object O located behind the column C in the +Y direction is visible to an observer viewing the cloaking assembly 10 in the +Y direction. Accordingly, the column C positioned within the cloaked region CR is not visible to an observer viewing the image-side 14 of the cloaking assembly 10 and an image of the object O is visible to the observer viewing the image-side 14. Although column C in FIG. 2 is separate from the inward facing surfaces 114, 124, 134, 144, i.e., column C is a separate object from the cloaking assembly 10, it should be appreciated that column C may be structurally part of the cloaking assembly 10 and have an outer surface that provides or is equivalent to the inward facing surfaces 114, 124, 134, 144.

Figure 4:
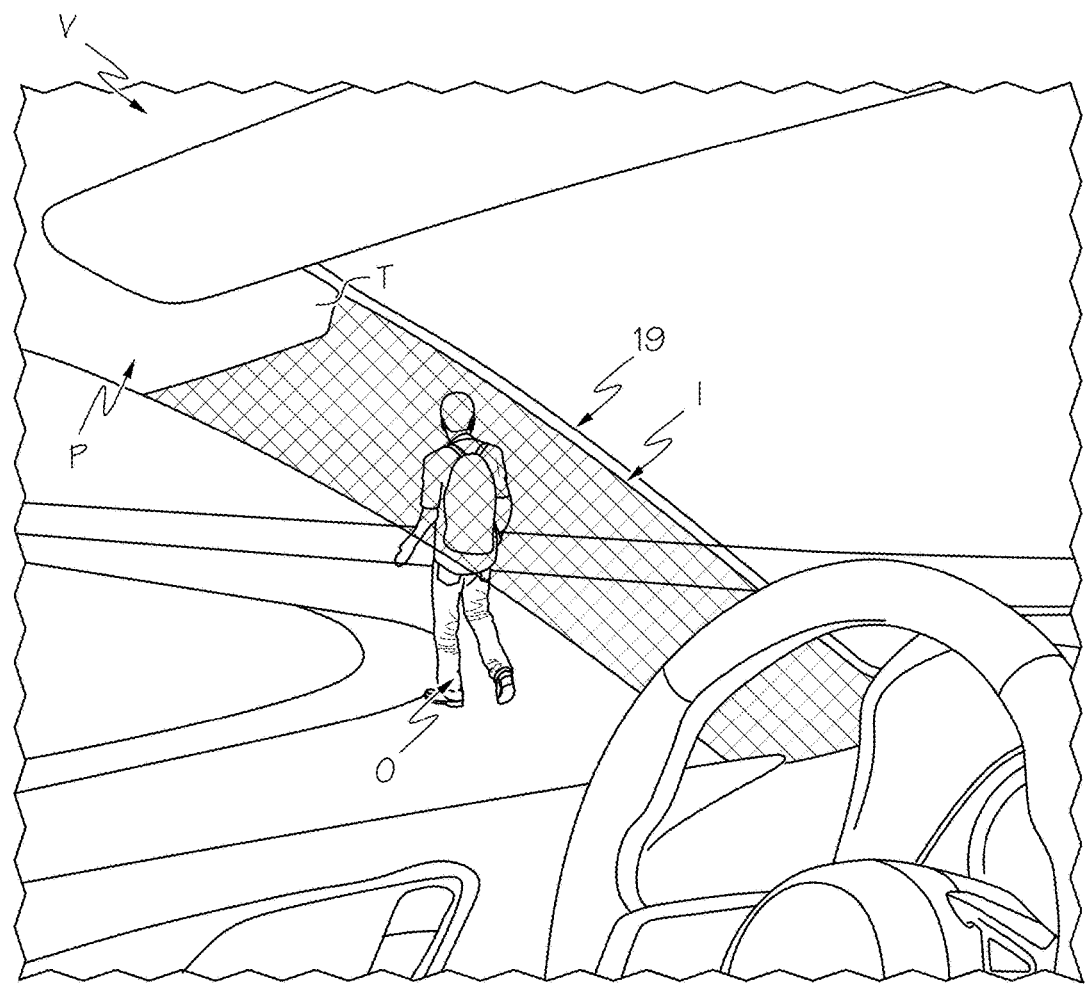
FIG. 4 schematically depicts a side view of a cloaking assembly cloaking an A-pillar of a vehicle according to one or more embodiments described and illustrated herein.

Referring to FIG. 4, embodiments of an A-pillar of a vehicle being cloaked by a cloaking device are shown. Particularly, FIG. 4 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O on an image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. It should be appreciated that cloaking of the A-pillar P with the cloaking device 19 and removing the blind spot produced by the A-pillar P is performed without the use of metamaterials, video images, cameras, sophisticated electronics, etc.

EXAMPLES

Figure 5A:
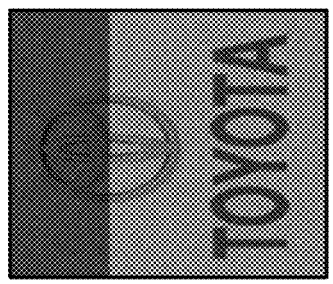
FIG. 5A depicts a computer simulated cloaking image for a cloaking assembly according to FIG. 1A with a 0° misalignment between a reference optical axis and a viewing angle of the cloaking assembly.
Figure 5B:
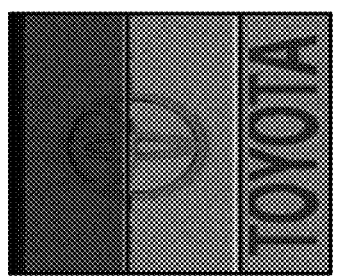
FIG. 5B depicts a computer simulated cloaking image for a cloaking assembly according to FIG. 1A with a 1° misalignment between a reference optical axis and a viewing angle of the cloaking assembly.
Figure 5C:
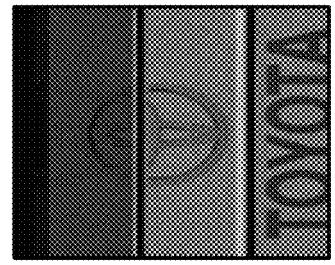
FIG. 5C depicts a computer simulated cloaking image for a cloaking assembly according to FIG. 1A with a 2° misalignment between a reference optical axis and a viewing angle of the cloaking assembly.
Figure 5D:
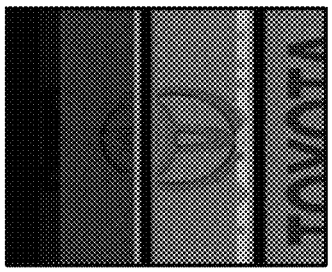
FIG. 5D depicts a computer simulated cloaking image for a cloaking assembly according to FIG. 1A with a 3° misalignment between a reference optical axis and a viewing angle of the cloaking assembly.
Figure 5E:
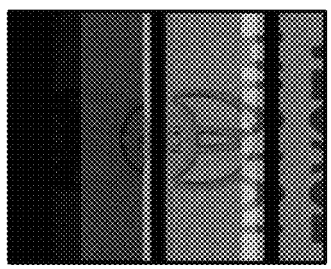
FIG. 5E depicts a computer simulated cloaking image for a cloaking assembly according to FIG. 1A with a 4° misalignment between a reference optical axis and a viewing angle of the cloaking assembly.

Referring now to FIGS. 5A-5E, images of an object in the form of a red vehicle positioned on the object-side 12 of the cloaking assembly 10 and as viewed from the image-side 14 simulated using a commercial software program (Zemax OpticStudio) are depicted. The cloaking assembly 10 with the two CR reflection boundaries 110, 120, two half-mirrors 152, 162, and two multiband dichroic color filters 154, 164, were provided in the form of two planar mirrors, two wire grid polarizers and two multiband dichroic color filters (#69-868, Edmund Optics) that are transparent to blue, green and red light with wavelengths of about 400-425 nm, 490-510 nm, and 625-675 nm, respectively, and reflect light with wavelengths of about 425-490 nm, 510-625 nm, and greater than 700 nm. Accordingly, the two multiband dichroic color filters 154, 164 provide the image in a light gray color. The cloaking assembly had a cloaking ratio of about 50%. FIG. 5A depicts an image of the object with no misalignment (0°) between the reference optical axis 16 and a viewing angle of the cloaking assembly 10. That is, as used herein, the term misalignment refers to an angle defined by the reference optical axis of a cloaking assembly and a line of sight of an observer viewing the cloaking assembly from the image-side as depicted by the +Y direction in the figures (also referred to herein as a "viewing angle"). FIG. 5B depicts an image of the object with a 1° misalignment between the reference optical axis 16 and a viewing angle of the cloaking assembly 10. FIG. 5C depicts an image of the object with a 2° misalignment between the reference optical axis 16 and a viewing angle of the cloaking assembly 10. FIG. 5D depicts an image of the object with a 3° misalignment between the reference optical axis 16 and a viewing angle of the cloaking assembly 10. FIG. 5E depicts an image of the object with a 4° misalignment between the reference optical axis 16 and a viewing angle of the cloaking assembly 10. As shown by the images in FIGS. 5A-5E, an image of the object on the object-side 12 of the cloaking assembly 10 can be seen clearly with up to 3° of misalignment and is still visible with up to 4° of misalignment. Accordingly, an observer can view or "see" the object O through the cloaked region CR even if the observer is not looking directly along the reference optical axis 16 of the cloaking assembly 10.

The cloaking devices described herein may be used to cloak vehicle articles such as a vehicle A-pillar, B-pillar, C-pillar, D-pillar, etc., and remove a blind spot caused by the vehicle article. Also, the cloaking devices described herein may be used to cloak articles such as extension cords, electrical conduit, piping, etc., in home, office and industrial environments. The terms "object," "article," and "item" may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
    an object-side, an image-side, a reference optical axis extending from the object-side to the image-side, and a cloaked region (CR) between the object-side and the image-side;
    an object-side CR reflection boundary, an object-side half-mirror, and an object-side multiband dichroic color filter, wherein the object-side half-mirror and the object-side multiband dichroic color filter are spaced apart from and positioned generally parallel to the object-side CR reflection boundary; and
    an image-side CR reflection boundary, an image-side half-mirror, and an image-side multiband dichroic color filter, wherein the image-side half-mirror and the image-side multiband dichroic color filter are spaced apart from and positioned generally parallel to the image-side CR reflection boundary;
    wherein light from an object located on the object-side of the cloaking device and obscured by the CR propagates via at least two optical paths to form an image of the object on the image-side of the cloaking device such that the light from the object appears to pass through the CR.

2. The cloaking device of claim 1, wherein:
    the object-side multiband dichroic color filter is co-planar with the object-side half-mirror; and
    the image-side multiband dichroic color filter is co-planar with the image-side half-mirror.

3. The cloaking device of claim 1, wherein:
    the object-side multiband dichroic color filter is co-planar with the object-side half-mirror and the object-side half-mirror is positioned proximal to the reference optical axis relative to the object-side multiband dichroic color filter; and
    the image-side multiband dichroic color filter is co-planar with the image-side half-mirror and the image-side half-mirror is positioned proximal to the reference optical axis relative to the image-side multiband dichroic color filter.

4. The cloaking device of claim 1, wherein:
    a portion of the light from the object on the object-side of the cloaking device is redirected around the CR via a first optical path comprising reflection from the object-side half-mirror and the image-side half-mirror;
    a portion of the light from the object on the object-side of the cloaking device is redirected around the CR via a second optical path comprising transmittance through the object-side half-mirror and the image-side half-mirror; and a portion of the light from the object on the object-side of the cloaking device propagates from the object-side to the image-side via a third optical path comprising transmittance through the object-side multiband dichroic color filter and the image-side multiband dichroic color filter.

5. The cloaking device of claim 1, wherein:

a portion of the light from the object on the object-side of the cloaking device is redirected around the CR via a first optical path comprising reflection from the object-side half-mirror, reflection from the object-side multiband dichroic color filter, reflection from the image-side half-mirror and reflection from the image-side multiband dichroic color filter;

a portion of the light from the object on the object-side of the cloaking device is redirected around the CR via a second optical path comprising transmittance through the object-side half-mirror, reflection from the object-side multiband dichroic color filter, reflection from the image-side multiband dichroic color filter and transmittance through the image-side half-mirror; and a portion of the light from the object on the object-side of the cloaking device propagates from the object-side to the image-side via a third optical path comprising transmittance through the object-side multiband dichroic color filter and transmittance through the image-side multiband dichroic color filter.

6. The cloaking device of claim 1, wherein the three optical paths comprise:

a first optical path: extending from the Object to the object-side CR reflection boundary; thereafter extending to the object-side half-mirror; thereafter extending to the object-side CR reflection boundary; thereafter extending to the object-side multiband dichroic color filter; thereafter extending to the image-side multiband dichroic color filter; thereafter extending to the image-side CR reflection boundary; thereafter extending to the image-side half-mirror; thereafter extending to the image-side CR reflection boundary; thereafter extending to the Image;

a second optical path: extending from the Object to the object-side half-mirror; thereafter extending to the object-side CR reflection boundary; thereafter extending to the object-side multiband dichroic color filter; thereafter extending to the image-side multiband dichroic color filter; thereafter extending to the image-side CR reflection boundary; thereafter extending to the image-side half-mirror; thereafter extending to the Image; and a third optical path: extending from the Object to the object-side multiband dichroic color filter; thereafter extending to the image-side multiband dichroic color filter; thereafter extending to the Image.

7. The cloaking device of claim 1, wherein the three optical paths comprise:

a first optical path: beginning at the Object and reflecting from the object-side CR reflection boundary; thereafter reflecting from the object-side half-mirror; thereafter reflecting from the object-side CR reflection boundary; thereafter reflecting from the object-side multiband dichroic color filter thereafter reflecting from the image-side multiband dichroic color filter thereafter reflecting from the image-side CR reflection boundary; thereafter reflecting from the image-side half-mirror; thereafter reflecting from the image-side CR reflection boundary to the Image;

a second optical path: beginning at the Object and transmitting through the object-side half-mirror; thereafter reflecting from the object-side CR reflection boundary; thereafter reflecting from the object-side multiband dichroic color filter; thereafter reflecting from the image-side multiband dichroic color filter; thereafter reflecting from the image-side CR reflection boundary; thereafter transmitting through image-side half-mirror to the Image; and a third optical path: beginning at the Object and transmitting through the object-side multiband dichroic color filter; thereafter transmitting through the image-side multiband dichroic color filter to the Image.

8. A cloaking device assembly comprising:

an object-side, an image-side, a cloaked region (CR) between the object-side and the image-side, and a reference optical axis extending from the object-side to the image-side;

a first object-side CR reflection boundary, a first object-side half-mirror, and a first object-side multiband dichroic color filter positioned on a first side of the reference optical axis, wherein the first object-side half-mirror and the first object-side multiband dichroic color filter are spaced apart from and positioned generally parallel to the first object-side CR reflection boundary;

a second object-side CR reflection boundary, a second object-side half-mirror, and a second object-side multiband dichroic color filter positioned on a second side of the reference optical axis opposite the first side, wherein the second object-side half-mirror and the second object-side multiband dichroic color filter are spaced apart from and positioned generally parallel to the second object-side CR reflection boundary;

a first image-side CR reflection boundary, a first image-side half-mirror, and a first image-side multiband dichroic color filter positioned on the first side of the reference optical axis, wherein the first image-side half-mirror and the first image-side multiband dichroic color filter are spaced apart from and positioned generally parallel to the first image-side CR reflection boundary; and a second image-side CR reflection boundary, a second image-side half-mirror, and a second image-side multiband dichroic color filter positioned on the second side of the reference optical axis opposite the first side, wherein the second image-side half-mirror and the second image-side multiband dichroic color filter are spaced apart from and positioned generally parallel to the second image-side CR reflection boundary;

wherein light from an object located on the object-side of the cloaking device assembly and obscured by the CR is redirected around the CR via at least two optical paths on the first side of the reference optical axis and at least two optical paths on the second side of the reference optical axis to form an image of the object on the image-side of the cloaking device assembly such that the light from the object appears to pass through the CR.

9. The cloaking device assembly of claim 8, wherein:

the first object-side multiband dichroic color filter is co-planar with the first object-side half-mirror and the second object-side multiband dichroic color filter is co-planar with the second object-side half-mirror; and the first image-side multiband dichroic color filter is co-planar with the first image-side half-mirror and the second image-side multiband dichroic color filter is co-planar with the second image-side half-mirror.

10. The cloaking device assembly of claim 8, wherein:
the first object-side multiband dichroic color filter is co-planar with the first object-side half-mirror and the second object-side multiband dichroic color filter is co-planar with the second object-side half-mirror;
the first object-side half-mirror and the second object-side half-mirror are positioned proximal to the reference optical axis relative to the first object-side multiband dichroic color filter and the second object-side multiband dichroic color filter, respectively;
the first image-side multiband dichroic color filter is co-planar with the first image-side half-mirror and the second image-side multiband dichroic color filter is co-planar with the second image-side half-mirror; and
the first image-side half-mirror and the second image-side half-mirror are positioned proximal to the reference optical axis relative to the first image-side multiband dichroic color filter and the second image-side multiband dichroic color filter, respectively.

11. The cloaking device assembly of claim 8, wherein:
a portion of the light from the object on the object-side of the cloaking device assembly is redirected around the CR via first optical paths comprising reflection from the first and second object-side half-mirrors and the first and second image-side half-mirrors;
a portion of the light from the object on the object-side of the cloaking device assembly is redirected around the CR via second optical paths comprising transmittance through the first and second object-side half-mirrors and the first and second image-side half-mirrors; and
a portion of the light from the object on the object-side of the cloaking device assembly propagates from the object-side to the image-side via third optical paths comprising transmittance through the first and second object-side multiband dichroic color filters and transmittance through the first and second image-side multiband dichroic color filters.

12. The cloaking device assembly of claim 8, wherein the at least two optical paths on the first side of the reference optical axis and the at least two optical paths on the second side of the reference optical axis comprise:
first optical paths: beginning at the Object and reflecting from first and second object-side CR reflection boundaries; thereafter reflecting from the first and second object-side half-mirrors; thereafter reflecting from the first and second object-side CR reflection boundaries; thereafter reflecting from the first and second object-side multiband dichroic color filters; thereafter reflecting from the first and second image-side multiband dichroic color filters; thereafter reflecting from the first and second image-side CR reflection boundaries; thereafter reflecting from the first and second image-side half-mirrors; thereafter reflecting from the first and second image-side CR reflection boundaries to the Image;
second optical paths: beginning at the Object and transmitting through the first and second object-side half-mirrors; thereafter reflecting from the first and second object-side CR reflection boundaries; thereafter reflecting from the first and second object-side multiband dichroic color filters; thereafter reflecting from the first and second image-side multiband dichroic color filters; thereafter reflecting from the first and second image-side CR reflection boundaries; thereafter transmitting through the first and second image-side half-mirrors to the Image; and
third optical paths: beginning at the Object and transmitting through the first and second object-side multiband dichroic color filters; thereafter transmitting through the first and second image-side multiband dichroic color filters to the Image.

13. The cloaking device assembly of claim 8, wherein the first object-side multiband dichroic color filter, the first image-side multiband dichroic color filter, the second object-side multiband dichroic color filter and the second image-side multiband dichroic color filter each reflect at least two separate ranges of visible light wavelengths and transmit at least two separate ranges of visible light wavelengths.

14. The cloaking device assembly of claim 13, wherein the first object-side multiband dichroic color filter, the first image-side multiband dichroic color filter, the second object-side multiband dichroic color filter and the second image-side multiband dichroic color filter reflect each reflect the same ranges of visible light wavelengths and transmit the same ranges of visible light wavelengths.

15. A vehicle comprising:
an A-pillar; and
a cloaking device positioned on the A-pillar, the cloaking device comprising:
an object-side, an image-side, a reference optical axis extending from the object-side to the image-side, and a cloaked region (CR) between the object-side and the image-side, wherein the A-pillar is positioned within the cloaked region, the object-side is positioned on an exterior of the vehicle and the image-side is positioned within an interior of the vehicle;
an object-side CR reflection boundary, an object-side half-mirror, and an object-side multiband dichroic color filter positioned on the object-side, wherein the object-side half-mirror and the object-side multiband dichroic color filter are spaced apart from and positioned generally parallel to the object-side CR reflection boundary; and
an image-side CR reflection boundary, an image-side half-mirror, and an image-side multiband dichroic color filter, wherein the image-side half-mirror and the image-side multiband dichroic color filter are spaced apart from and positioned generally parallel to the image-side CR reflection boundary;
wherein light from an object located on the object-side of the cloaking device and obscured by the A-pillar is redirected around the A-pillar via at least two optical paths to form an image of the object on the image-side of the cloaking device such that the light from the object appears to pass through the A-pillar.

16. The vehicle of claim 15, wherein:
the object-side multiband dichroic color filter is co-planar with the object-side half-mirror; and
the image-side multiband dichroic color filter is co-planar with the image-side half-mirror.

17. The vehicle of claim 15, wherein:
the object-side multiband dichroic color filter is co-planar with the object-side half-mirror and the object-side half-mirror is positioned proximal to the reference optical axis relative to the object-side multiband dichroic color filter; and
the image-side multiband dichroic color filter is co-planar with the image-side half-mirror and the image-side half-mirror is positioned proximal to the reference optical axis relative to the image-side multiband dichroic color filter.

18. The vehicle of claim 15, wherein:
a portion of the light from the object on the object-side of the cloaking device is redirected around the CR via a first optical path comprising reflection from the object-side half-mirror and the image-side half-mirror;
a portion of the light from the object on the object-side of the cloaking device is redirected around the CR via a second optical path comprising transmittance through the object-side half-mirror and the image-side half-mirror; and
a portion of the light from the object on the object-side of the cloaking device propagates from the object-side to the image-side via a third optical path comprising transmittance through the object-side multiband dichroic color filter and the image-side multiband dichroic color filter.

19. The vehicle of claim 15, wherein:
a portion of the light from the object on the object-side of the cloaking device is redirected around the CR via a first optical path comprising reflection from the object-side half-mirror, reflection from the object-side multiband dichroic color filter, reflection from the image-side multiband dichroic color filter and reflection from the image-side half-mirror;
a portion of the light from the object on the object-side of the cloaking device is redirected around the CR via a second optical path comprising transmittance through the object-side half-mirror, reflection from the object-side multiband dichroic color filter, reflection from the image-side multiband dichroic color filter and transmittance through the image-side half-mirror; and
a portion of the light from the object on the object-side of the cloaking device propagates from the object-side to the image-side via a third optical path comprising transmittance through the object-side multiband dichroic color filter and transmittance through the image-side multiband dichroic color filter.

20. The vehicle of claim 15, wherein the three optical paths comprise:
a first optical path: beginning at the Object and reflecting from the object-side CR reflection boundary; thereafter reflecting from the object-side half-mirror; thereafter reflecting from the object-side CR reflection boundary; thereafter reflecting from the object-side multiband dichroic color filter thereafter reflecting from the image-side multiband dichroic color filter; thereafter reflecting from the image-side CR reflection boundary; thereafter reflecting from the image-side half-mirror; thereafter reflecting from the image-side CR reflection boundary to the Image;
a second optical path: beginning at the Object and transmitting through the object-side half-mirror; thereafter reflecting from the object-side CR reflection boundary; thereafter reflecting from the object-side multiband dichroic color filter thereafter reflecting from the image-side multiband dichroic color filter; thereafter reflecting from the image-side CR reflection boundary; thereafter transmitting through the image-side half-mirror to the Image; and
a third optical path: beginning at the Object and transmitting through the object-side multiband dichroic color filter; thereafter transmitting through the image-side multiband dichroic color filter to the Image.

* * * * *

UNITED STATES PATENT AND TRADEMARK OFFICE
CERTIFICATE OF CORRECTION

PATENT NO. : 10,479,276 B2
APPLICATION NO. : 15/945398
DATED : November 19, 2019
INVENTOR(S) : Chengang Ji et al.

Page 1 of 1

It is certified that error appears in the above-identified patent and that said Letters Patent is hereby corrected as shown below:

In the Claims

In Column 21, Line 65, after "filter", insert --;--.

In Column 21, Line 66, after "filter", insert --;--.

In Column 26, Line 14, after "filter", insert --;--.

Signed and Sealed this
Seventh Day of January, 2020

Andrei Iancu
*Director of the United States Patent and Trademark Office*